United States Patent [19]

Crawford et al.

[11] 4,022,121
[45] May 10, 1977

[54] ADJUSTMENT CAMS FOR REMOVING END PLAY FROM TYING MECHANISM ON A BALER

[75] Inventors: LeRoy A. Crawford, New Holland; Irwin D. McIlwain, Lancaster, both of Pa.

[73] Assignee: Sperry Rand Corporation, New Holland, Pa.

[22] Filed: Aug. 18, 1976

[21] Appl. No.: 715,360

[52] U.S. Cl. .................. 100/29; 172/656; 172/741; 403/148; 289/2
[51] Int. Cl.² ........................ B65B 13/18
[58] Field of Search .......... 100/4, 8, 31, 29, 19–24; 29/125; 172/120, 123, 550, 599, 600, 603, 656, 741; 403/160, 292, 343, 367, 380, 388, 3, 4, 145, 148, 149; 74/230.17 M, 567, 568; 289/2, 10

[56] References Cited
UNITED STATES PATENTS

| | | | |
|---|---|---|---|
| 625,529 | 5/1899 | Andress | 403/380 X |
| 1,802,038 | 4/1931 | Springstead | 29/125 |
| 2,723,871 | 11/1955 | Rudeen | 289/10 |
| 2,858,758 | 11/1958 | Carter | 172/599 |
| 2,926,599 | 3/1960 | McClellan | 100/2 |
| 3,385,624 | 5/1968 | Baclini | 403/4 |
| 3,536,347 | 10/1970 | Radford | 289/2 |

*Primary Examiner*—Billy J. Wilhite
*Attorney, Agent, or Firm*—Frank A. Seemar; John R. Flanagan; Michael R. Swartz

[57] ABSTRACT

A tying mechanism on a baler having a bale forming chamber incorporates an improvement for removing end play between the components of the tying mechanism. The tying mechanism includes an elongated drive shaft and a plurality of side-by-side units mounted along the shaft and operable to carry out tying of strands of material that band a bale being formed in the bale chamber. The tying units are movable axially along the shaft for adjusting them to predetermined operational positions relative to one another. The improvement relates to a pair of annular adjustment cams being mounted about and releasably secured to the shaft between the units. The cams of each pair thereof engage one another and are individually rotatable, upon release of the securement thereof to the shaft, for movement to various angular positions relative to each other about the shaft to vary the width of the space occupied by the pair of cams and thereby adjust the units relative to one another and maintain the same at the predetermined positions along the shaft.

10 Claims, 4 Drawing Figures

ADJUSTMENT CAMS FOR REMOVING END PLAY
FROM TYING MECHANISM ON A BALER

BACKGROUND OF THE INVENTION

1. FIELD OF THE INVENTION

The present invention relates generally to a baler and, more particularly, is concerned with an improvement for removing end play between the components of a tying mechanism on the baler.

2. DESCRIPTION OF THE PRIOR ART

A conventional baler has a tying mechanism mounted on a fore-and-aft extending bale forming chamber of the baler. The tying mechanism is commonly mounted above the top of the bale chamber and a plurality of needles are mounted below the bottom of the bale chamber which are operable to carry strands of banding material upwardly through the bale chamber to the tying mechanism upon completing formation of a bale in the bale chamber.

The tying mechanism includes a main transverse drive shaft and a stack or assembly of two or three side-by-side tying units mounted thereon, depending upon whether two or three strands of material are to band the completed bale. The tying units are movable axially along the shaft to initially adjust and set up the same at predetermined operational positions relative to each other wherein they will be properly aligned with the strand-carrying needles. Ordinarily, annular cylindrical-shaped collars and/or washers are mounted on the shaft between the tying units for maintaining the units at such predetermined positions and for providing surfaces that will accept wear and thereby minimize the amount of wear of the adjacently-positioned surfaces of the tying units.

For proper operation of the tying mechanism, the tying units and the collars and/or washers therebetween must be retained together in a compact stack or assembly. Excessive "end play" or looseness between the components will accelerate wear and, if not corrected, can result in breakage of operative parts of the tying units. Since some end play commonly develops between the components of the stack during long periods of normal use of the baler, periodic checks must be carried out and adjustments undertaken in order to discover and correct the end play problem.

Heretofore, in order to remove end play between the components, the operator has had to disassemble one or more of the tying units from the drive shaft and then insert additional washers on the shaft to fill the unwanted space which had developed between the components as the components are reassembled back together on the shaft.

Because of the inconvenience of this adjustment procedure for correction of the end play problem and the inordinate amount of time required to carry it out, operators are apt to delay making the necessary end play corrections until it is too late.

SUMMARY OF THE INVENTION

The present invention provides an improvement for removing end play between the components of the tying mechanism on the baler without the necessity of first having to disassemble the mechanism. As a result, an adjustment procedure for correction of end play problems is provided that is simple and convenient for the operator to carry out and requires only a small amount of his time.

Accordingly, the present invention relates to an improvement incorporated in a tying mechanism on a baler. The tying mechanism includes an elongated shaft and at least two units along the shaft and operable to carry out tying of strands of material that band a bale being formed in the bale chamber of the baler. At least one of the tying units is movable axially along the shaft for adjusting the position thereof relative to the other of the tying units.

The improvment is comprised by a pair of elements on the shaft between the tying units. The elements engage one another and at least one of the elements is movable to various angular positions relative to the other of the elements about the shaft to change the width of the space occupied by the elements between the units and thereby adjust the position of the one movable unit axially along the shaft relative to the other unit.

More particularly, the pair of elements are comprised by a pair of annular cams rotably mounted about the shaft and a fastener threadably received by each of the cams for releasably securing the same to the shaft. The cams respectively have surfaces located adjacent to and engaging one another which extend in oblique angular relationship to the shaft such that predetermined rotation about the shaft of one cam relative to the other cam forces the one cam to also move axially along the shaft in a direction away from the other cam. Also, each of the cams have a bore defined in the periphery thereof within which a tool may be inserted to facilitate rotation of the cam about the shaft.

The advantages and attainments of the improvement provided by the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which.

DETAILED DESCRIPTION OF THE INVENTION

In the following description, right hand and left hand references are determined by facing in the direction of the arrow in FIG. 1, which is the same as the forward direction of travel of the hay baler upon which the knotter mechanism is mounted. Also, in the following description, it is to be understood that such terms as "forward," "rearward," "left," "upwardly," etc., are words of convenience and are not to be construed as limiting terms.

IN GENERAL

Figure 1:
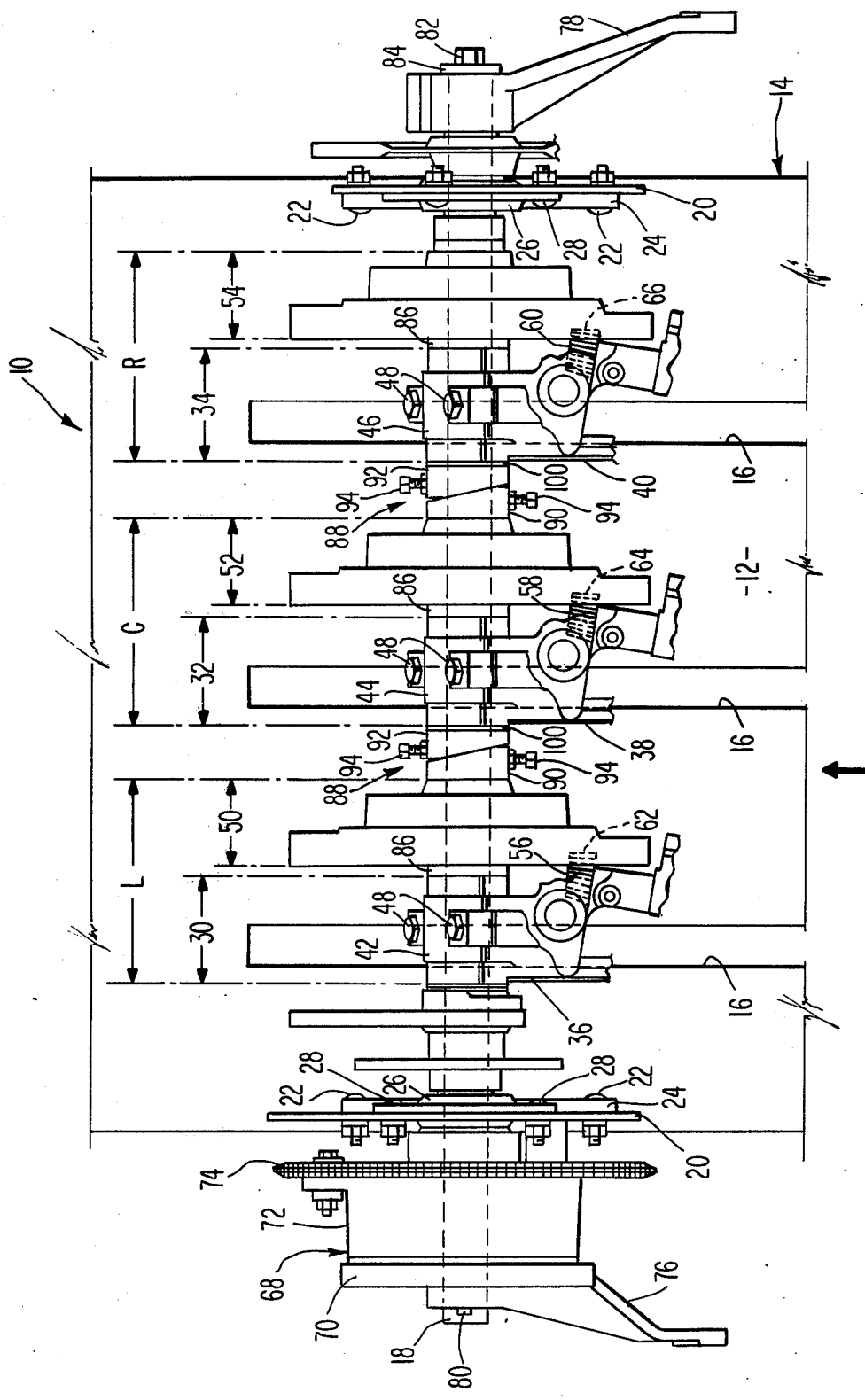
FIG. 1 is a top plan view of a fragmentary portion of a hay baler showing a portion of the twine knotter mechanism which incorporates the improvement provided by the present invention and a portion of the bale chamber of the baler on which the knotter mechanism is mounted.

Referring now to the drawings, and particularly to FIG. 1, there is shown a twine tying or knotter mechanism, being indicated generally by numeral 10, mounted on an intermediate portion of the top wall 12 of a fore-and-aft extending bale chamber 14 of a hay baler. The mechanism 10 incorporates the improvement provided by the present invention.

While in the illustrated arrangement, the knotter mechanism 10 is mounted on the top wall 12 of the bale chamber 14 and twine carrying needles (not shown) are mounted at the bottom of the bale chamber and carry twine strands upwardly through the bale chamber and through fore-and-aft extending slots 16 formed thereinto the knotter mechanism upon completing formation of a bale in the bale chamber, it is to be understood that the knotter mechanism 10 may be mounted either on the top of the bale chamber or on one side thereof with the needles corresponding mounted either on the bottom of the bale chamber or on the other opposite side thereof. The improvement provided by the present invention is not dependent upon the particular mounting location of the knotter mechanism 10 relative to the bale chamber 14.

The knotter mechanism 10 includes a main drive shaft 18 which is mounted inwardly from its opposite ends by upstanding brackets 20 being connected by bolts 22 to laterally spaced apart vertical braces 24 fixed upon opposite side portions of the bale chamber top wall 12. Bearings 26 attached to the respective brackets 20 by bolts 28 and mounted within opening in the brackets rotatably mount the shaft 18. By such mounting arrangement, the rotatable drive shaft 18 is disposed in spaced relationship above and extends transversely across the bale chamber top wall 12 with the opposite end portions of the drive shaft 18 extending outwardly beyond the opposite longitudinal side edges of the bale chamber top wall 12.

The knotter mechanism 10 further includes, preferably, three conventional identical knot tying devices 30,32,34 which include respective frames 36,38,40 (the rear portions of which have been omitted). The frames at their forward ends respectively include elongated hubs 42,44,46 having bores therein through which the drive shaft 18 extends and in which the shaft 18 is rotatable. The hubs are comprised by split sections which fit about the shaft 18 and are secured together by bolts 48 which facilitate easy removal of individual frames from the shaft when servicing or repair is required without first disassembling other components of the knotter mechanism 10 from the shaft thereof. In order to prevent rotation of the knot tying device frames 36,38,40 with the shaft 18 when the latter is rotated, the frames at their rearward ends (not shown) are secured to vertical tabs (not shown) being fixed at transversely spaced locations to the bale chamber top wall 12. While the frames 36, 38, 40 are thus restrained from undergoing rotation with the shaft 18, their securements at their rearward ends are such as to allow a slight amount of lateral or side-to-side movement should the hub ends of the frames need to be laterally moved along the shaft 18 to adjust the positions thereof relative to other components of the mechanism 10 in order to eliminate "end play" or looseness between the components of the mechanism. The improvement provided by the present invention is readily operable to eliminate the end play problem and will be described in detail later.

Each of the knot tying devices 30,32,34 have various operable components (not shown) mounted on the frames 36,38,40 thereof which cooperate with the three twine needles, when the latter deliver portions of three twine strands upwardly through the three slots 16 in the bale chamber top wall 12, to tie knots in the respective strands which longitudinally encircle a bale formed in the bale chamber 14.

For driving the various knot tying components carried by the device frames 36,38,40, the knotter mechanism 10 includes three conventional cam gears 50,52,54 mounted on the shaft 18, each adjacent a respective one of the knot tying devices 30,32,34. Woodruff keys (not shown) secure the respective cam gears 50,52,54 to the drive shaft 18 for rotation therewith, but allow the cam gears to be moved axially along the shaft 18. In order to transmit the rotary motion of the drive shaft 18 to the various knot tying components on the device frames 36,38,40, the cam gears have several internal gear teeth sections which are adapted to mesh with several beveled gears whch are drivingly connected to the various operative components of each o the knot tying devices. Depicted in FIG. 1 in broken line form are beveled gears 56,58,60, which each is representative of the several drive gears of each of the devices 30,32,34, being meshed with respective internal teeth sections 62,64,66, which each is representative of the several teeth sections on each of the cam gears 50,52,54.

For regulating the rotation of the shaft 18, a clutch, generally designated 68, is mounted on the shaft at the left end portion thereof and includes a first clutch part 70 drivingly connected to the shaft 18 and an adjacently-positioned second clutch part 72 rotatably journalled on the shaft 18 and carrying a chain sprocket 74. A drive chain (not shown) drivingly connects a power driven component of the baler (not shown) to the sprocket 74 so that the latter, together with the second clutch part 72 connected thereto, is constantly driven. A bale length measuring mechanism (not shown) will cause a latch (not shown) to release the first clutch part 70 each time a bale being formed in the bale chamber 14 reaches a predetermined length. Release of the first clutch part 70 by the latch allows the part 70 to become engaged with the constantly rotating second clutch part 72. The first clutch part 70 then rotates and therewith the shaft 18 rotates, but only through one complete rotation cycle. At the end of the single rotation cycle of the shaft 18, the latch (not shown) automatically causes the first clutch part 70 to disengage from the second clutch part 72 and cease its rotation and consequently rotation of the shaft 18.

Concurrently with each single rotation cycle of the first clutch part 70 and the shaft 18, a left lever arm 76 fixed to the first clutch part 70 and the right lever arm 78 fixedly mounted to the right end portion of the shaft 18 are rotated in unison therewith and through interconnecting linkages (not shown) drivingly move a frame (not shown) supporting the three needles through a complete cycle which brings the needles upwardly through the bale chamber 14 and the slots 16 therein to deliver the twine strand portions to the knot tying devices 30,32,34 and then returns the needles back downwardly to their home positions below the bale chamber 14. Also, concurrently with each single rotation cycle of the shaft 18, the cam gears 50,52,54 are rotated through 360°. Such rotation of the cam gears, in turn, rotates the respective beveled gears, such as gears 56,58,60, and thereby cause the knot tying components on the frames 36,38,40 to tie knots in a known manner in the respective twine strand portions delivered thereto by the three needles.

The drive shaft 18 is restrained from axial movement in either direction by a cotter pin 90 secured at its left end portion and abutting the outer side of the first clutch part 70 and a nut 82 threaded onto the right end of the shaft 18 with a washer 84 being disposed about the shaft 18 between the nut 82 and the right lever arm 78. The cam gears 50,52,54 and the frames of the respective knot tying devices are disposed adjacent one another in an alternating series along the shaft 18 between the bearings 26 on the left and right mounting brackets 20 along with several other components positioned on the shaft 18 between the left device frame 36 and the left mounting bracket bearing 26 such that a compact stack or assembly of components comprising three tying units R, C, L, in the knotter mechanism 10 is provided. Also, within the stack of components, washers 86 are disposed on the shaft 18 between pairs of adjacent tying devices 30,32,34 and cam gears 50,52,54 which constitute the tying units so as to initially dispose the respective device frame and cam gear of each of the units in a predetermined desired positional relationship relative to each other in which the respective gears of the knot tying devices 30,32,34 are disposed within the path of the internal gear teeth sections of the cam gears 50,52,54 so as to insure meshing thereof upon rotation of the shaft 18 and cam gears therewith.

IMPROVEMENT FOR REMOVING END PLAY BETWEEN COMPONENTS OF KNOTTER MECHANISM

The improvement provided by the present invention allows for individual lateral adjustment of the positions along the shaft 18 of any of the three tying units R, C, L, being comprised by the pairs of adjacent tying devices 30,32,34 and cam gears 50,52,54 to remove any end play or looseness which may develop between the components of the knotter mechanism 10.

Figure 2:
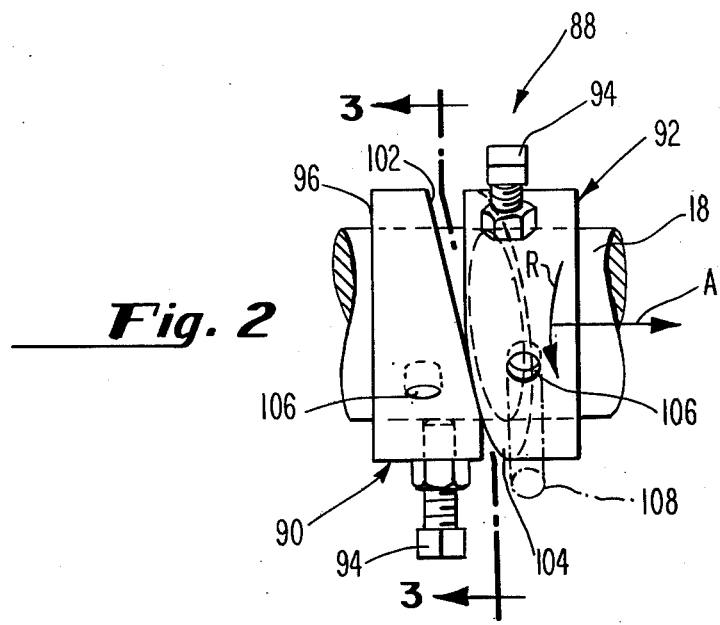
FIG. 2 is an enlarged view of a fragmentary portion of the knotter mechanism of FIG. 1, showing in rear elevation one of the pairs of adjustment cams incorporated by the knotter mechanism, with a portion of the knotter mechanism drive shaft which mounts the cams being illustrated and with the pair of adjustment cams which constitute the improvement provided by the present invention being illustrated at a different position of adjustment on the drive shaft relative to each other than that shown in FIG. 1.
Figure 3:
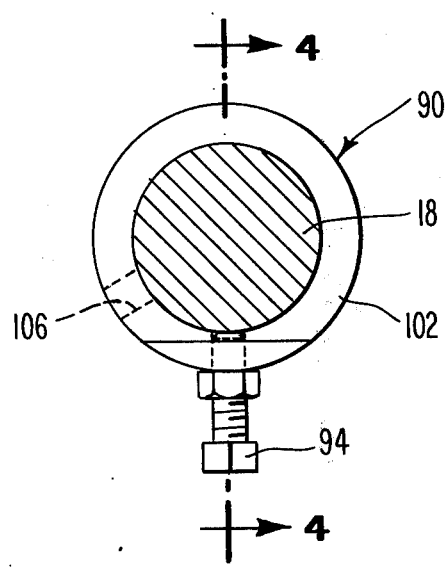
FIG. 3 is a view taken along line 3—3 of FIG. 2, showing one of the adjustment cams in end elevation with the drive shaft mounting the same being illustrated in cross section.
Figure 4:
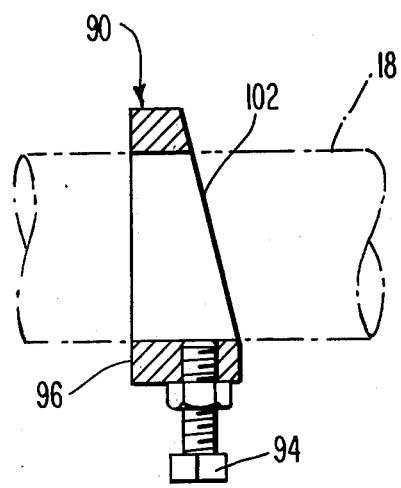
FIG. 4 is a view taken along line 4—4 of FIG. 3, showing the adjustment cam of FIG. 3 in section with its bolt for attaching it to the drive shaft being illustrated in elevation and the fragmentary portion of the drive shaft mounting the cam being illustrated in broken line form.

Specifically, as seen in FIG. 1 and also in detail FIGS. 2 through 4, the improvement is comprised by two pairs of adjustment elements 88, one pair being located on the shaft 18 between the right and center tying units R, C and the other pair being located on the shaft 18 between the center and left tying units C, L. Each pair of elements include a pair of annular left and right cams 90,92 rotatably mounted about the shaft 18 and a fastener 94 threadably received by each of the cams 90,92 within a threaded bore formed therein for releasably securing the cam to the shaft 18. Each left cam 90 at its outer end surface 96, which extends in a plane disposed generally perpendicular to the shaft 18, abuts against an adjacent right end surface of a respective one of the cam gears 50,52 of the tying units L, C. Each right cam 92 at its outer end surface 98, which extends in a plane generally perpendicular to the shaft 18, abuts against a washer 100 disposed on the shaft 18 which, in turn, abuts against an adjacent left end surface of a respective one of the tying device frames 38,40 of the tying devices 32,34 of the tying units C, R. Furthermore, each left cam 90 at its inner end surface 102, which extends in a plane disposed at an oblique angle relative to the shaft 18, abuts against the inner end surface 104 of the one of the right cams 92 in that particular pair, the surface 104 also extending in a plane disposed at an oblique angle relative to the shaft 18.

In FIG. 1, each of the pairs of cams 90,92 are illustrated in angular positions relative to each other about the shaft that their respective inner end surfaces are flush against one another. FIG. 2 illustrates a different angular positional relationship between the cams 90,92 wherein, after the securement of the right cam 92 to the shaft 18 by bolt 94 has been loosened, the right cam 92 has been rotated about the shaft 18 in the direction of arrow R approximately 180° relative to the left cam 90. It will be seen that such rotation of the right cam 92 also forces axial movement thereof away from the left cam 90 in the direction of arrow A due to the engagement between the obliquely disposed respective inner surfaces 102,104 of the cams 90,92 and thereby laterally adjusts the position of the adjacent one of the tying units R, C, L. Also, a bore 106 is defined in the periphery of each of the cams 90,92 within which a tool 108 may be inserted to facilitate rotation of each of the cams 90,92 about the shaft 18.

It is readily apparent that the cams 90,92 may be rotatably adjusted to any position between their flush relationship shown in FIG. 1 and the 180° angularly displaced relationship shown in FIG. 2 for varying the width of the space along the shaft 18 occupied by the pair of cams. In actual practice, in order to remove end play between the components of the tying mechanism 10, only a slight amount of angular rotational adjustment of particular ones of the cams 90,92 about the shaft 18 would usually be necessary, since the unwanted space which results between the components need not be great before its adverse effect on the operation of the knotter mechanism 10 will be felt.

While two pairs of the adjustment elements 88 being associated with a knotter mechanism 10 having three tying units R, C. L are disclosed herein, the improvement provided by the present invention also encompasses the use of one or more pairs of the adjustment elements 88 in association with a knotter mechanism having only two tying units. Further, even though the improvment is disclosed herein as being incorporated into a knotter mechanism which is the type that ties knots in strands of twine material binding the bale, the present invention also encompasses the use of one or more pairs of the adjustment elements 88 in association with other types of tying mechanisms for forming knots or connections in strands of other types of banding materials, such as wire, in view of the fact that the problem of end play also arises between components of such other types of mechanisms.

It is thought that the improvement of the present invention and many of its attendant advantages will be understood from the foregoing description and it will be apparent that various changes may be made in the form, construction and arrangement of the parts thereof described without departing from the spirit and scope of the invention or sacrificing all of its material advantages, the form hereinbefore described being merely a preferred or exemplary embodiment thereof.

Having thus described the invention, what is claimed is:

1. In a tying mechanism on a baler having a bale forming chamber, said mechanism including an elongated shaft and at least two units mounted along said shaft and operable to carry out tying of strands of material that band a bale being formed in said bale chamber, at least one of said units being movable axially along said shaft for adjusting the position thereof relative to the other of said units, the improvement comprising:
a pair of elements on said shaft between said units, said elements engaging one another and at least one of said elements being movable to various angular positions relative to the other of said elements about said shaft to change the width of the space occupied by said elements between said units and thereby adjusts the position of said one movable unit axially along said shaft relative to said other unit.

2. A tying mechanism as recited in claim 1, wherein said elements have surfaces located adjacent to and engaging one another which extend in angular relationships to said shaft such that predetermined movement about said shaft of said one element forces said one element to also move axially along said shaft in a direction away from said other element.

3. A tying mechanism as recited in claim 1, wherein said pair of elements comprise:
a pair of annular cams rotatably mounted about said shaft; and
a fastener threadably received by each of said cams for releasably securing the same to said shaft.

4. A tying mechanism as recited in claim 3, wherein said cams have surfaces located adjacent to and engaging one another which extend at an oblique angle relative to said shaft.

5. A tying mechanism as recited in claim 3, wherein each of said cams have a bore defined in the periphery thereof within which a tool may be inserted to facilitate rotation of said cam about said shaft.

6. In a tying mechanism on a baler having a bale forming chamber, said mechanism including an elongated shaft and at least two units mounted along said shaft and operable to carry out tying of strands of material that band a bale being formed in said bale chamber, at least one of said units being movable axially along said shaft for adjusting the position thereof relative to the other of said units, the improvement comprising:
a pair of elements on said shaft between said units, said elements engaging one another and being movable to various angular positions relative to each other about said shaft to change the width of the space occupied by said elements between said units and thereby adjust the position of said one movable unit axially along said shaft relative to said other unit.

7. A tying mechanism as recited in claim 6, wherein said pair of elements comprise:
a pair of annular cams rotatably mounted about said shaft; and
means for releasably securing each of said cams to said shaft at said various angular positions of said cams relative to each other.

8. A tying mechanism as recited in claim 7, wherein said cams have surfaces located adjacent to and engaging one another which extend along planes disposed in angular relationships to said shaft such that predetermined rotation about said shaft of one cam relative to the other cam forces said one cam to also move axially along said shaft in a direction away from said other cam.

9. In a tying mechanism on a baler having a bale forming chamber, said mechanism including an elongated shaft and a plurality of units mounted along said shaft and operable to carry out tying of strands of material that band a bale formed in said bale chamber, said units being movable axially along said shaft for adjusting the positions thereof relative to one another, the improvement comprising:
a pair of elements on said shaft between said units, said elements engaging one another and being movable to various angular positions relative to each other about said shaft to change the width of the space occupied by said elements between said units and thereby ajust the relative positions of said units axially along said shaft.

10. In a tying mechanism on a baler having a bale forming chamber, said mechanism including a main drive shaft, support means for mounting said shaft on said bale chamber, a plurality of side-by-side units mounted on said shaft and operable to carry out tying of strands of material that band a bale being formed in said bale chamber, said units being movable axially along said shaft for adjusting the same to predetermined operational positions relative to one another, the improvement comprising:
a pair of annular cams mounted about and releasably secured to said shaft between said units, said cams of said pair engaging one another and each being rotatable, upon release of the securement thereof to said shaft, to move to various angular positions relative to the other about said shaft to vary the width of the space occupied by said pair of cams and thereby adjust said units relative to one another and maintain the same at said predetermined operational positions along said shaft.

* * * * *

Disclaimer 4,022,121.—*Le Roy A. Crawford*, New Holland and *Irwin D. McIlwain*, Lancaster, Pa. ADJUSTMENT CAMS FOR REMOVING END PLAY FROM TYPING MECHANISM ON A BALER. Patent dated May 10, 1977. Disclaimer filed Feb. 17, 1981, by the assignee, *Sperry Corp.*

Hereby enters this disclaimer to claims 1, 2, 6 and 9 of said patent.

[*Official Gazette April 28, 1981.*]